(12) United States Patent
Spackman et al.

(10) Patent No.: US 10,703,242 B2
(45) Date of Patent: Jul. 7, 2020

(54) HEAD RESTRAINT ASSEMBLY (71) Applicant: JAGUAR LAND ROVER LIMITED, Warwickshire (GB)

(72) Inventors: Ryan Spackman, Coventry (GB); Cristian Turcu, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 16/149,436

(22) Filed: Oct. 2, 2018

(65) Prior Publication Data
US 2019/0126798 A1    May 2, 2019

(30) Foreign Application Priority Data

Oct. 6, 2017 (GB) .................................. 1716363.5

(51) Int. Cl.
*B60N 2/865* (2018.01)
*B60N 2/80* (2018.01)

(52) U.S. Cl.
CPC ........ *B60N 2/865* (2018.02); *B60N 2002/899* (2018.02)

(58) Field of Classification Search
CPC ........ B60N 2/865; B60N 2/847; B60N 2/853; B60N 2/838; B60N 2002/899
See application file for complete search history.

(56) References Cited

U.S. PATENT DOCUMENTS

| 6,079,776 | A | 6/2000 | Breitner et al. | |
|---|---|---|---|---|
| 7,484,797 | B2 * | 2/2009 | Akaike | B60N 2/821 297/216.12 |
| 7,520,564 | B2 * | 4/2009 | Woerner | B60N 2/865 297/216.12 |
| 2002/0043860 | A1 | 4/2002 | Dinkel et al. | |
| 2003/0015631 | A1 | 1/2003 | Chu | |
| 2004/0021358 | A1 | 2/2004 | Gramss et al. | |
| 2007/0246989 | A1 * | 10/2007 | Brockman | B60N 2/865 297/391 |
| 2015/0130247 | A1 * | 5/2015 | Kondrad | B60N 2/821 297/410 |
| 2015/0329023 | A1 * | 11/2015 | Ishihara | B60N 2/865 297/406 |
| 2017/0174108 | A1 | 6/2017 | An et al. | |

FOREIGN PATENT DOCUMENTS

| DE | 10202598 A1 | 8/2003 |
|---|---|---|
| FR | 2832365 A1 | 5/2003 |
| FR | 2891505 A1 | 4/2007 |

OTHER PUBLICATIONS

Combined Search and Examination Report under Sections 17 and 18(3) for Application No. GB1716363.5 dated Mar. 22, 2018.

* cited by examiner

*Primary Examiner* — Philip F Gabler
(74) *Attorney, Agent, or Firm* — Carlson, Gaskey & Olds (57) ABSTRACT

A head restraint assembly for a seat which includes a housing and a movable head rest portion which defines at least a part of a rest surface for a seat user's head. The movable head rest portion is pivotally mounted to the housing via a linkage mechanism that is configured to allow pivotal movement of the movable head rest portion to enable the angle of the rest surface relative to the housing to be adjusted.

18 Claims, 9 Drawing Sheets

(a) Deployed Position (b) Stowed Position

HEAD RESTRAINT ASSEMBLY

CROSS REFERENCE TO RELATED APPLICATION

This application claims priority to United Kingdom Patent Application No. GB 1716363.5, filed on 6 Oct. 2017.

TECHNICAL FIELD

The present disclosure relates to a head restraint assembly for a seat. In particular, but not exclusively, the invention relates to a head restraint assembly for a vehicle seat. Aspects of the invention relate to a head restraint assembly, to a seat assembly including a head restraint assembly and to a vehicle including a head restraint assembly.

BACKGROUND

Conventional in-vehicle head restraints perform the function of enhancing passenger safety and are often designed to be attached or integrated into the top of each driver and passenger seat. More specifically, head restraints are designed to limit the rearward movement of the head of an adult occupant relative to their torso, in the instance of a high-speed collision or crash for example, in order to prevent or mitigate whiplash or injury to the passenger's cervical vertebrae.

Many in-vehicle rear passenger seats are able to be adjusted or reclined for comfort, such that they are sat at an approximately 45 degree angle, often referred to as the "slouch" mode or position. When rear-seated passengers are sat in these "slouch" positions, conventional in-vehicle head restraints will only support the passengers head in a position such that they are looking or facing upwards (i.e. towards the inside of the roof of the vehicle), which might be suitable if the passenger is sleeping, for example. However if the rear passenger sat in the "slouch" position wishes to look or face forwards (i.e. in an aft-fore direction) in order to, for example, read a book, look at a laptop screen or look out the front of the vehicle, the conventional in-vehicle head restraint position becomes unsuitable. This is because the seated passenger is required to bend their neck into an unsupported position in order to look or face forwards, which can cause discomfort to the passenger. It is therefore beneficial for in-vehicle head restraints belonging to rear passenger seats to perform a secondary function, unrelated to automotive safety, such as providing a comfortable rest position for the passenger seated in a variety of positions.

In related prior art, passenger seat head restraints use a pivot-point deployment/stowage mechanism in order to move a head rest portion (about a single pivot-point or hinge located on the top part of the housing of the seat-head) into position and provide a comfortable support for the passenger's head. However, once fully deployed, the single pivot-point deployment/stowage mechanism results in significant space wastage. This is because the space beneath the seat's deployed head rest portion, which is rendered unusable, is a significantly large area of space.

It is one object of the present invention to provide a head restraint assembly which improves on the prior art.

SUMMARY OF THE INVENTION

According to an aspect of the present invention there is provided a head restraint assembly, a seat assembly and a vehicle as claimed in the appended claims.

According to an aspect of the invention, there is provided a head restraint assembly for a seat. The head restraint assembly comprising a housing and a movable head rest portion which defines at least a part of a rest surface for a seat user's head. The movable head rest portion is pivotally mounted to the housing via a linkage mechanism. The linkage mechanism is configured to allow pivotal movement of the movable head rest portion to enable the angle of the rest surface relative to the housing to be adjusted.

The head restraint assembly has particular application in a vehicle seat where it provides certain advantages. Advantageously, the head restraint assembly may provide support to a user of the vehicle seat when the seat is reclined or in a "slouch mode". In particular, this is advantageous when a user of the vehicle seat wishes to look forward such as to view a laptop screen or to look out the front window of the vehicle. The present invention advantageously provides pivotal movement of the head rest portion through a range of positions. The head restraint assembly is a self-contained, "plug and play", modular head restraint assembly, which can minimise labour and assembly costs for vehicle manufacturers whilst improving production efficiency. Another advantage of the present application is that the head restraint assembly can fit into the housing of a conventional head restraint belonging to an existing in-vehicle passenger seat. As a result, it is possible for vehicle manufacturers to introduce the head restraint assembly of the present application into production with minimal associated costs and effort.

In defining the nomenclature used in the present application, "aft" refers to the rear of the vehicle and "fore" refers to the front of the vehicle. The "aft-fore" direction therefore refers to a direction facing the front of the vehicle away from the rear of the vehicle. Conversely, the "fore-aft" direction refers to a direction facing the rear of the vehicle away from the front of the vehicle.

In an example embodiment, the housing defines a recess and the movable head rest portion is pivotally movable relative to the housing between a stowed position in which it resides within the recess and a deployed position in which at least a first end of the movable head rest portion (e.g. a lower end of the movable head rest portion) is displaced away from the housing.

In an example embodiment, an upper portion of the rest surface is defined by the housing and a lower portion of the rest surface is defined by the movable head rest portion.

The head restraint assembly may comprise a linkage mechanism comprising a pivot axis and the movable head rest portion is pivotal about the pivot by causing a first end of the movable head rest portion to move towards or away from the housing. Optionally, the linkage mechanism is configured such that the pivot axis moves away from the housing when the first end of the movable head rest portion is moved away from the housing.

As the head rest portion is moved away from the housing the pivot axis is configured to move in at least one of a forward and a downward direction. Conversely, as the head rest portion is moved towards the housing the pivot axis is configured to move in an upward and rearward direction. This is due to the fact that the head rest portion pivots about a linkage bar which is moved as the head rest portion moves.

In an example embodiment, the linkage mechanism includes at least first and second linkage bars. Typically, the first linkage bar may be pivotally mounted to the movable head rest portion at a first end and is pivotally mounted to the housing at a second end thereof.

In one embodiment, the first end of the first linkage bar is pivotally mounted to the movable head rest portion via a friction hinge.

Typically, the second linkage bar is pivotally mounted to the movable head rest portion at a first end thereof and is fixedly mounted to the housing at a second end thereof. The fixed mounting of the second end of the second linkage bar to the housing may prevent translation of the second end but allow pivoting movement of the second linkage bar relative to the housing.

In an example embodiment, the second end of the first linkage bar is pivotally coupled to the housing via a sliding means. The sliding means is arranged to enable the second end of the first linkage bar to slide perpendicularly relative to the fore-aft direction of the seat.

In one embodiment the sliding means may comprise at least one sliding pin located within an aperture at the second end of the first linkage bar and configured to engage at least one runner defined within the housing. In an embodiment the sliding pin may be spring loaded.

In an embodiment, the at least one runner may comprise at least one ramped recess configured for receiving the at least one sliding pin.

In another embodiment, the at least one runner may comprise a first ramped recess configured to secure the head rest portion in a stowed position and a second ramped recess configured to secure the head rest portion in a deployed position.

In an embodiment the at least one runner may comprise at least one further ramped recess configured to secure the head rest portion in at least one intermediate position configured to secure the head rest portion in at least one intermediate position.

Advantageously, the sliding pin may engage a ramped recess to secure the head rest portion in a stowed or deployed position. The ramped recesses may be located at any position on the sliding means thereby enabling the positions at which the head rest portion is secured at to be selected. The at least one further ramped recess enables the head rest portion to be secured at an intermediate position thus providing the user with multiple positions at which the head rest portion may be secured at. This increases the comfort and configurability of the head restraint assembly.

In an embodiment, the housing may define two runners arranged to be located on either side of the second end of the first linkage bar, and the first linkage bar comprises two sliding pins configured to engage the two runners defined within the housing.

In an example embodiment, the first and second linkage bars are connected together at the pivot axis. Typically, the pivot axis is located part-way along the length of the each of the first and second linkage bars. The first and second linkage bars may, for example, be pivotally coupled via a connecting pin. Optionally, the connecting pin may be received within an aperture provided in the first or second linkage bar. The aperture may, for example, take the form of a slot. In an embodiment, the slot may be configured to guide movement of the connecting pin along the length of the first linkage bar or the second linkage bar as the head rest portion is adjusted relative to the housing.

In an example embodiment, the linkage mechanism is configured such that the pivot axis moves away from the housing when the movable head rest portion is moved from the stowed position to the deployed position.

The benefit of providing a friction hinge to pivotally mount the first linkage bar to the movable head rest portion is that the head rest portion can be held firmly in position, including at a plurality of intermediate positions between a stowed position and a fully deployed position, until such time as sufficient force is applied to move the head rest portion out of position to overcome a resistance force of the friction hinge. This provides the user with a plurality of different, fixed positions for the head rest portion to optimise comfort.

In one embodiment, the housing is fixed in the fore-aft direction relative to the seat.

In another embodiment, the housing is movable in an up-down direction relative to the seat.

In an example embodiment, the head restraint assembly comprises a first motor for controlling movement of the housing in the up-down direction. For example, the first motor may be housed within the housing.

In an example embodiment, the head restraint assembly comprises a second motor for controlling aft-fore and fore-aft movement of the housing. For example, the second motor may be housed within the housing. Therefore, in one embodiment, the head restraint assembly may comprise first and second motors both housed within the housing of the head restraint assembly thus enabling powered movement of the head restraint in both the up-down and fore-aft directions.

In an example embodiment, the second motor has a solid spindle. The benefit of providing the solid spindle is that is rigidity can provide a greater resistance to an impact in the backwards ("fore-aft" direction) and forwards ("aft-fore" direction), typically created by a vehicle crash or impact. As a result, a solid spindle helps to ensure that the head restraint assembly provides enhanced support to the passenger's head and neck during and after a crash, preventing or mitigating damage to the passenger's cervical vertebrae. This type of linkage mechanism can therefore enhance the overall crash and post-crash health and safety properties of the in-vehicle passenger seat assembly and of the vehicle concerned. Another associated benefit of having a solid spindle in the "fore-aft"/"aft-fore" direction is that there is a more stable movement of the head rest portion in the "fore-aft"/"aft-fore" direction with less unwanted motion in the other directions, which enhances the comfort to the passenger/user.

In an example embodiment, the movable head rest portion is cushioned or padded. Typically, the housing may be cushioned or padded in the same manner as the movable head rest portion.

According to another aspect of the invention, there is provided a seat assembly comprising the head restraint assembly of the previous aspect.

According to another aspect of the invention, there is provided a vehicle comprising the seat assembly or the head restraint assembly of one of the previous aspects of the invention.

According to a further aspect of the invention, there is provided a head restraint assembly for a vehicle seat, the head restraint assembly comprising a housing and a movable head rest portion which defines at least a part of a rest surface for a seat user's head, wherein the movable head rest portion is pivotally mounted to the housing via a linkage mechanism, and wherein the linkage mechanism is configured to allow pivotal movement of the movable head rest portion to enable the angle of the rest surface to be adjusted relative to the housing to be adjusted, wherein the linkage mechanism includes first and second linkage bars, wherein the first linkage bar is pivotally coupled to the housing via a sliding means, wherein the sliding means comprises a sliding pin and the sliding pin is configured to engage a runner within the housing, and wherein the runner comprises at least; a first recess configured to receive the sliding pin to secure the head rest portion in a first deployed position; and a second recess configured to receive the sliding pin to secure the head rest portion in a second deployed position.

According to another aspect of the invention, there is provided a head restraint assembly for a vehicle seat, the head restraint assembly comprising: a housing, which defines a recess; and a movable head rest portion, which defines at least a part of a rest surface for a seat user's head; wherein the movable head rest portion is pivotally mounted to the housing via a linkage mechanism, wherein the linkage mechanism is configured to allow pivotal movement of the movable head rest portion to enable the angle of the rest surface to be adjusted relative to the housing, wherein the linkage mechanism includes first and second linkage bars, wherein the first linkage bar is pivotally coupled to the housing via a sliding means, wherein the sliding means comprises a sliding pin and the sliding pin is configured to engage a runner within the housing, wherein the runner comprises at least; a first recess configured to receive the sliding pin to secure the head rest portion in a first deployed position; and a second recess configured to receive the sliding pin to secure the head rest portion in a second deployed position; and wherein the movable head rest portion is pivotally movable relative to the housing between the first and second deployed positions in which at least a first end of the movable head rest portion is displaced away from the housing and a stowed position in which the movable head rest portion resides within the recess.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A head restraint assembly 100 of the present invention, for use in a seat assembly 10 of a vehicle 1, defines a rest surface 108, 109 for a user's head. The head restraint assembly 100 is operable between stowed and deployed positions, and a range of positions in between, so as to provide various different head rest positions for the user to provide comfort to the user in a variety of different seat positions.

Figure 1:
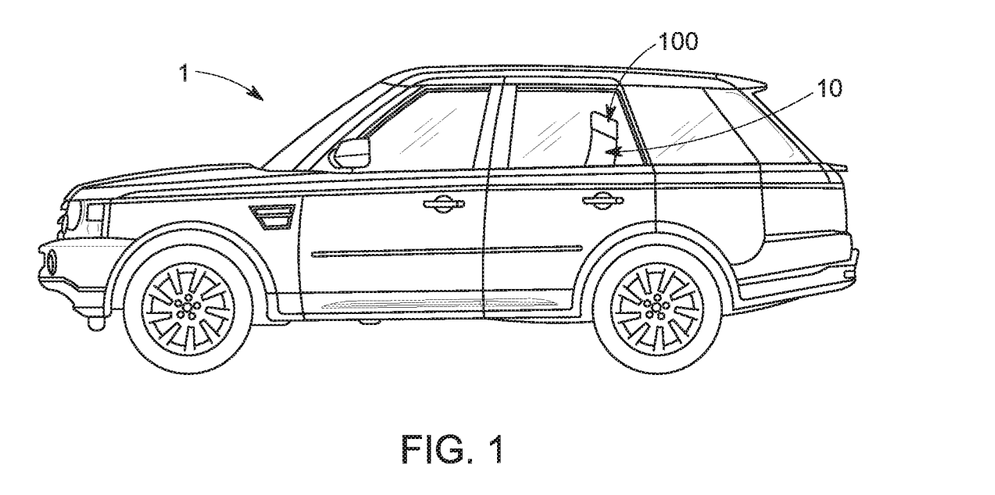
FIG. 1 illustrates a seat assembly belonging to a vehicle comprising a head restraint assembly of the present invention.
Figure 2:
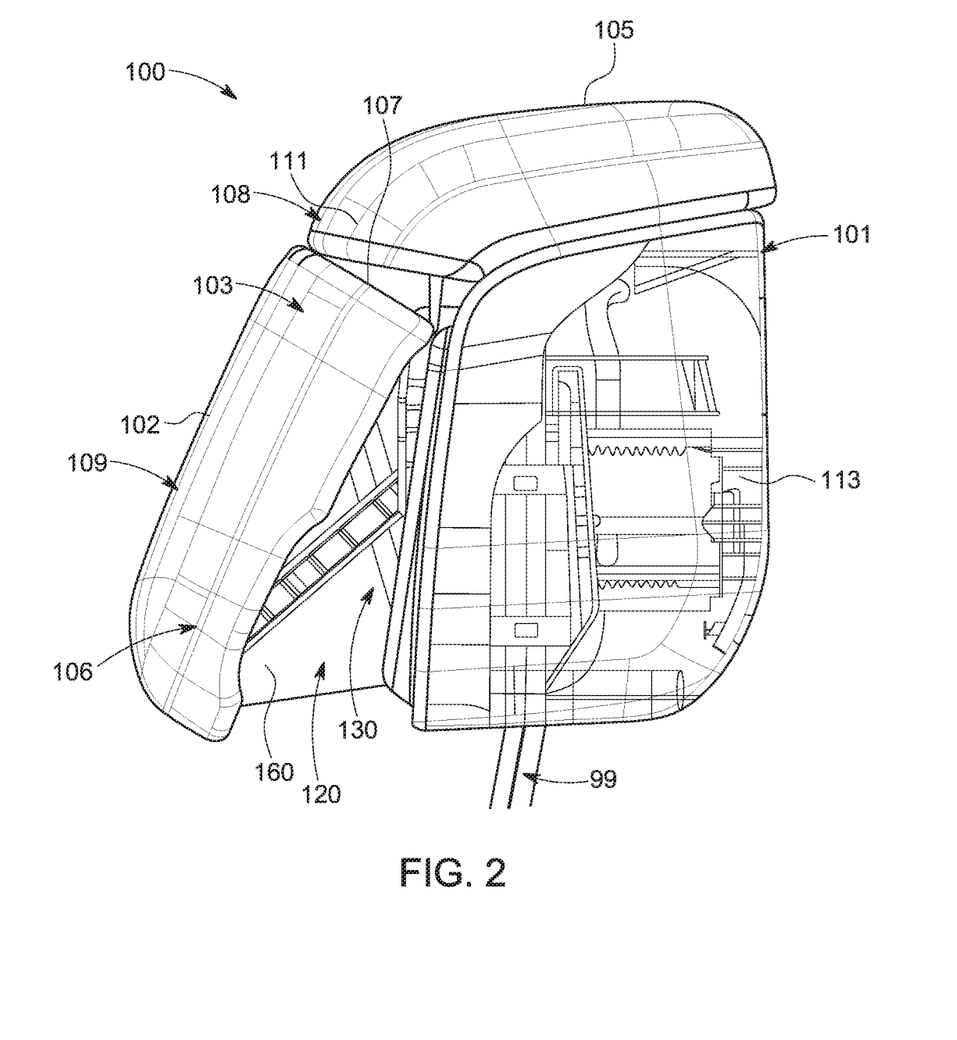
FIG. 2 illustrates a left side view of an embodiment of the head restraint assembly of the present invention when in a deployed position.
Figure 3:
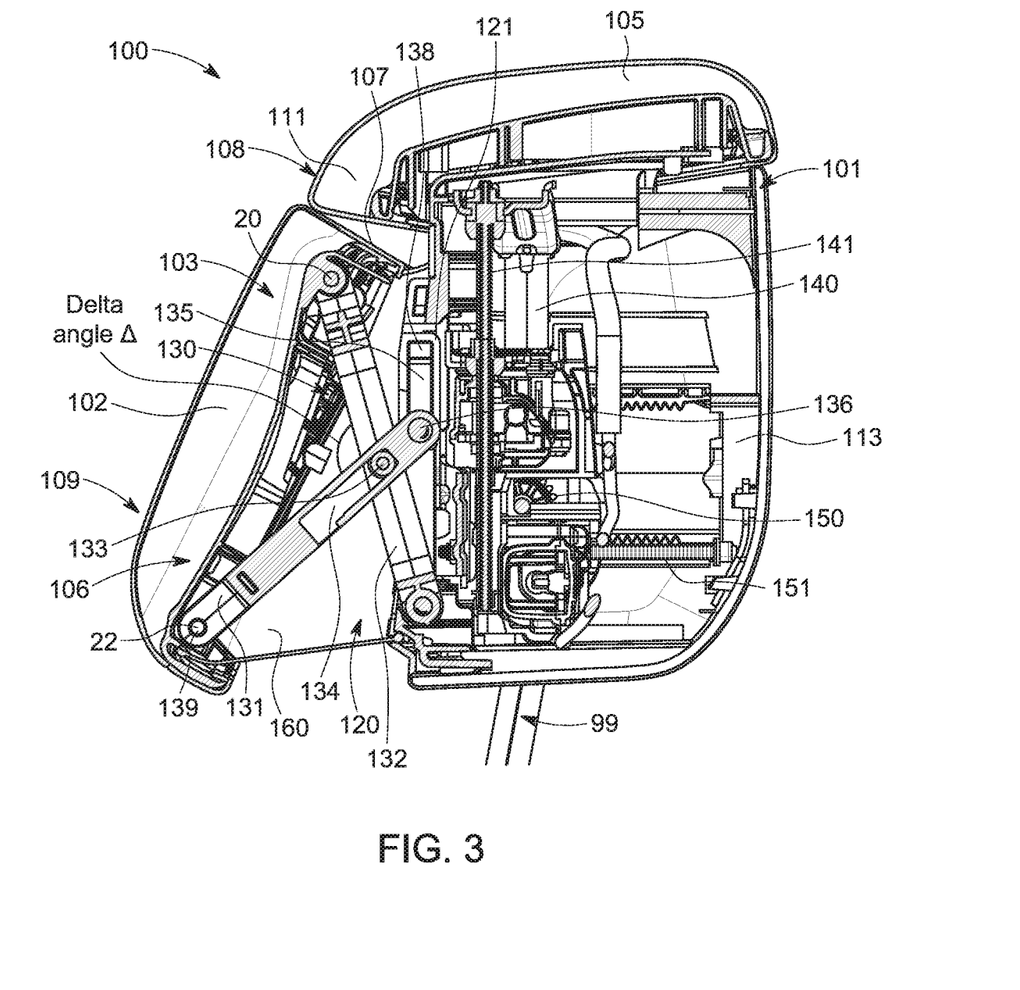
FIG. 3 illustrates a cross-sectional view of the left side of the head restraint assembly shown in FIG. 2.
Figure 4:
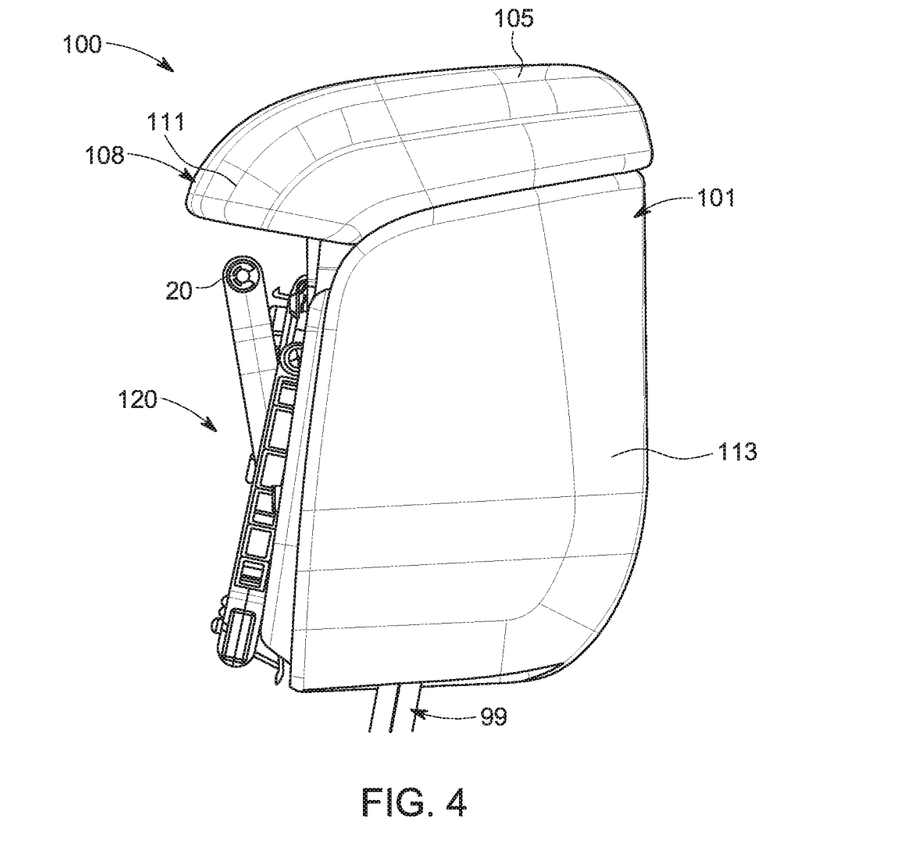
FIG. 4 illustrates a left side view of a housing of the head restraint assembly when in the stowed position.

FIG. 1 illustrates the seat assembly 10 belonging to the vehicle 1 comprising the head restraint assembly 100 of the present invention, Referring to FIGS. 2 to 4, the head restraint assembly 100 comprises a housing 101 and a movable head rest portion 102 (not shown in FIG. 4). The movable head rest portion 102 defines at least a part of a rest surface 108, 109 for supporting a seat user's head and provides support to the head of a passenger typically seated in a rear in-vehicle passenger seat when it is reclined in a "slouch" mode or position (i.e. typically sitting at approximately a 45 degree angle). The movable head rest portion 102 also supports the head in a raised or upright position so that seated passengers can look in a forward (i.e. aft-fore) direction relative to the seat direction, enabling the seated passenger to, for example, comfortably read a book, look at a laptop screen or look out the front of the vehicle. Furthermore, supporting the head in a raised or upright position so that seated passengers can look in the aft-fore direction relative to the seat direction can advantageously help reduce motion sickness and improve overall passenger comfort during car journeys. The movable head rest portion 102 and the assembly housing 101 may be upholstered in the same way as the passenger seat for aesthetic reasons. The head restraint assembly 100 is assembled onto the vehicle seat assembly 10 via support struts 99.

Figure 8:
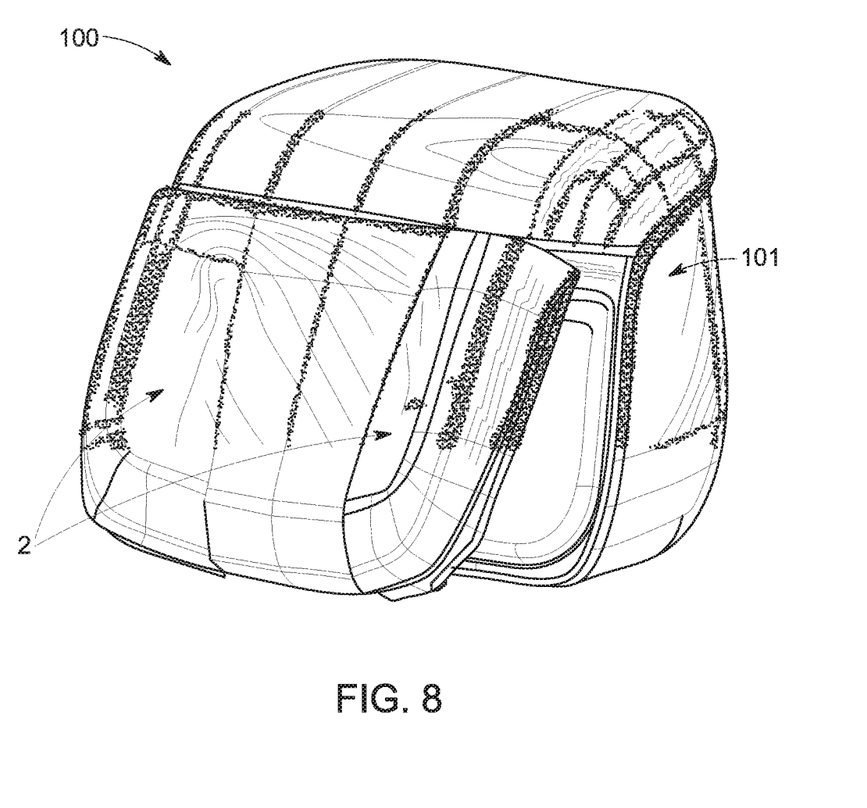
FIG. 8 illustrates a perspective view of the head restraint assembly in FIGS. 2 to 5 with adjustable side wings.

The head rest portion 102 typically takes the form of a "tilt-out" pillow to enhance the comfort of the seated passenger. As illustrated in FIG. 8, the movable head rest portion 102 or the housing 101 may further include one "tilt-out" side portion 2 (also referred to as a side wing) on either side of the head rest portion 102. The side wings 2 are designed to provide support for the left and right sides of the passenger's head and neck. The side wings 2 typically take the form of hinged-pillows and may be upholstered in the same way as the passenger seat and assembly housing 101 to enhance the comfort of the seated passenger and to improve the aesthetics of the assembly.

The housing 101 includes a main housing 113 for housing various control features for the head restraint assembly 100, as will be described in further detail below, and a top housing portion 105. The top housing portion 105 protrudes beyond the main housing 113, on the front side, to define an overhang portion 111.

As can be seen in FIG. 2, the head rest portion 102 includes a lower base end 106 and an upper end 103 and is pivotally mounted to the main housing 113 via a linkage mechanism, referred to generally as 130. The linkage mechanism 130 is configured to allow pivotal movement of the head rest portion 102 to enable the angle of the rest surface 108, 109 relative to the main housing 113 to be adjusted. As can be seen most clearly in FIG. 4, the main housing 113 and the overhang 111 together define a recess 120 within which the head rest portion 102 is received when in its stowed position. The movable head rest portion 102 is pivotally movable relative to the main housing 113 between a stowed position, in which it resides within the recess 120, and a deployed position in which at least the lower end 106 of the movable head rest portion 102 is displaced or stands proud from the recess 120.

As can be seen in FIGS. 2 and 3, the head restraint assembly 100 defines a rest surface for the user's head which includes upper and lower rest surface portions 108, 109 respectively. The lower surface portion 109 of the rest surface is defined by the movable head rest portion 102. The upper surface portion 108 of the rest surface is defined at least partly by the overhang 111 of the top housing portion 105.

Figure 5:
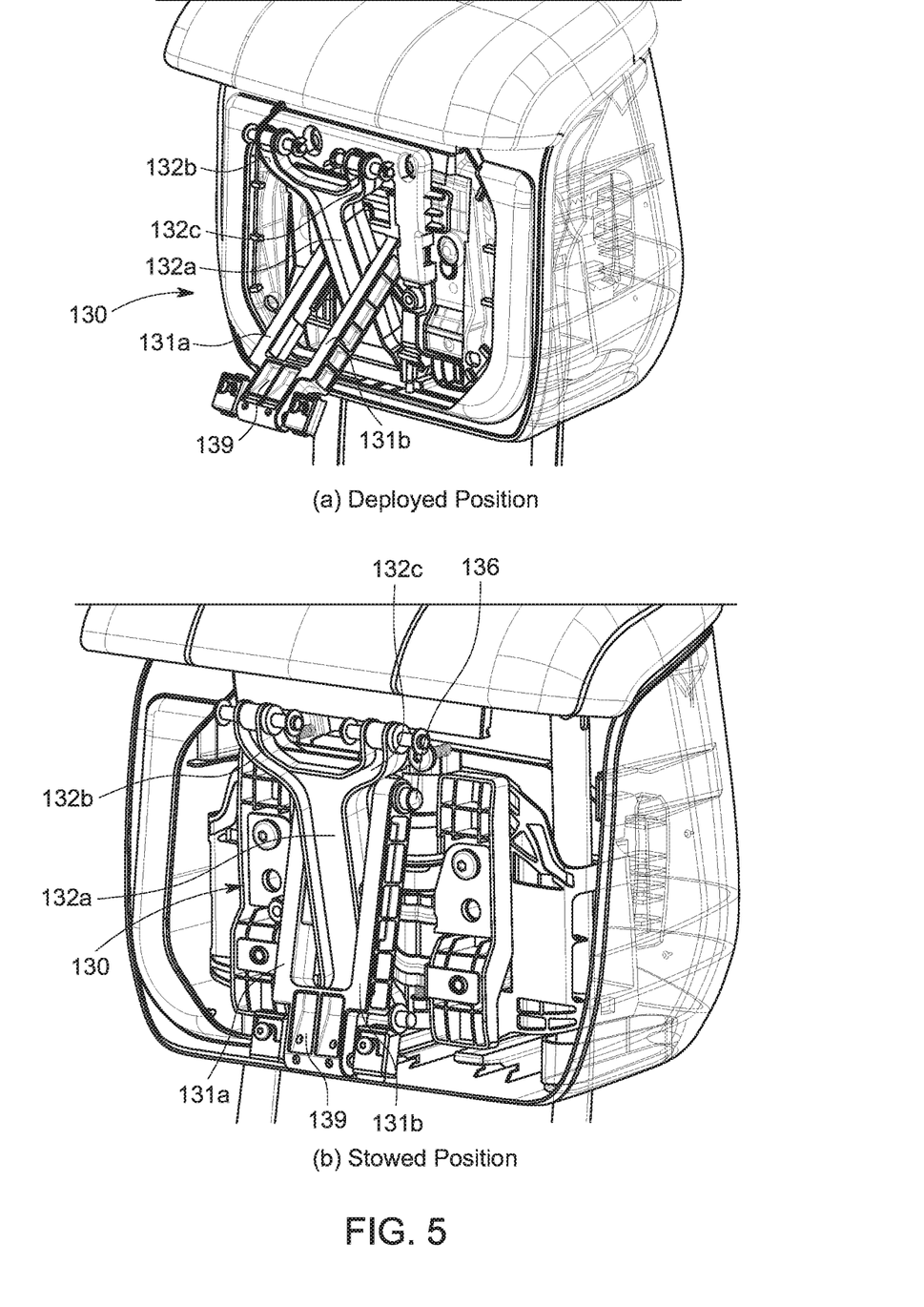
FIGS. 5A and 5B illustrate a front perspective view of the head restraint assembly in FIGS. 2 to 4, with a movable head rest portion removed, to illustrate a two-bar linkage mechanism of the head restraint assembly in more detail with the head restraint assembly in its deployed position in FIG. 5A, and the head restraint assembly in its stowed position in FIG. 5B.

As can be seen most clearly in FIG. 5, the linkage mechanism 130 is a two-bar linkage mechanism and includes a first linkage bar 131 and a second linkage bar 132. Each linkage bar has one end which lies relatively forward the other end of the linkage bar (in the aft-fore direction) in all operating positions; the ends of the linkage bars will thus be referred to as the forward and rear ends of the bars.

The first linkage bar 131 comprises first and second arms 131*a*, 131*b* which are connected together at the forward end thereof to define the first linkage bar 131. The first linkage bar 131 is pivotally mounted, at the forward end thereof, to the lower base end 106 of the movable head rest portion 102 (not shown in FIG. 5) via a friction hinge 139. The rear end of the first linkage bar 131 (the upper ends of the arms 131*a*, 131*b* as shown in FIG. 5) is pivotally mounted to the main housing 113 via slider members 121 (only one of which is shown in the side views of FIGS. 2 to 4) mounted to the main housing 113.

The slider member 121 for one of the linkage arms 131*a* or 131*b* defines a runner 135 and at least one ramped recess 138 for receiving a sliding means in the form of a sliding pin 136 located at the rear end of the associated arm 131*a* or 131*b* of the first linkage bar 131 so as to couple the arm 131*a*, 131*b* to the slider member 121 in a pivotal manner thereby enabling pivotal movement of the head rest portion 102.

Figure 9:
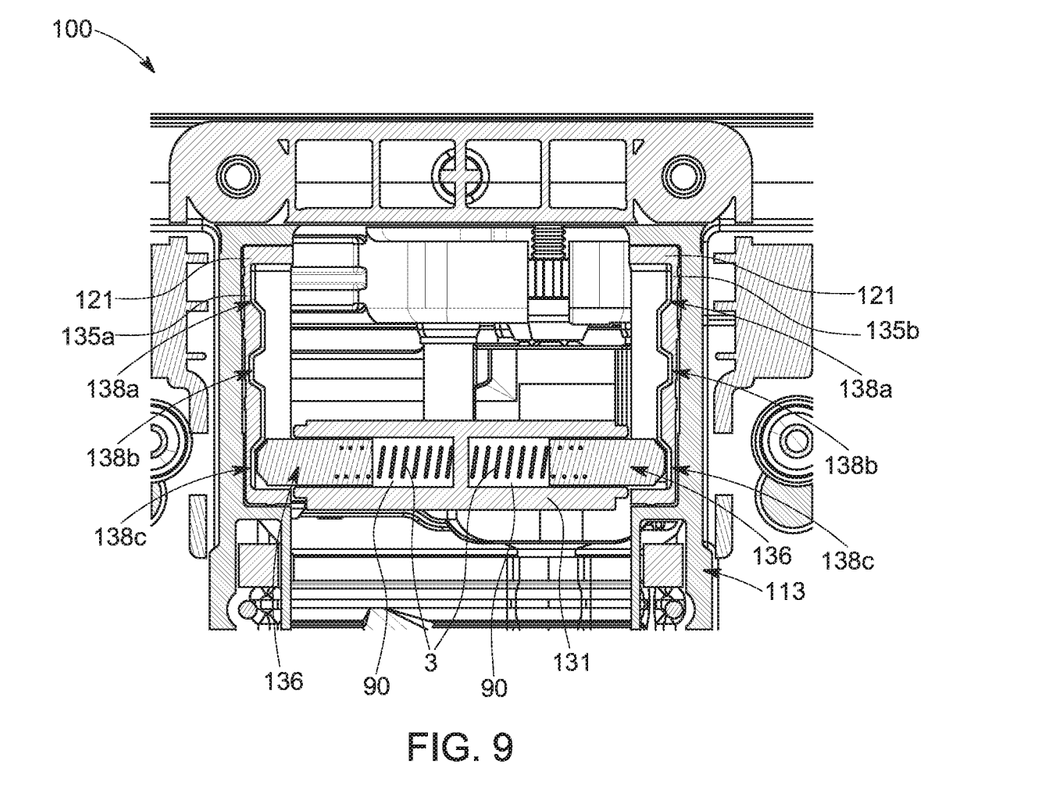
FIG. 9 illustrates a plane schematic cross sectional view of the head restraint assembly in FIGS. 2 to 5, showing the runners and ramped recesses for receiving a sliding means in the form of a spring loaded sliding pins.

FIG. 9 illustrates a plane schematic cross sectional view of the head restraint assembly 100, showing two slider members 121 mounted to the main housing 113 defining two runners 135*a*, 135*b* positioned on either side of the interior of the main housing 113. In the example shown, each runner 135*a*, 135*b* has three ramped recesses 138*a*, 138*b*, 138*c*, however, in alternative embodiments each runner 135*a*, 135*b* may have any number of ramped recesses including zero. Ramped recesses 138*a* and 138*c* are positioned at opposing ends of the runners 135*a* and 135*b*. Ramped recess 135*b* is positioned at an intermediate position therebetween. The ramped recesses 138*a*, 138*b*, 138*c* are configured for receiving sliding means in the form of two sliding pins 136. The two sliding pins 136 are located within an aperture 90 on the first linkage bar 131. The sliding pins 136 are configured to engage with and slide up and down the two runners 135 (i.e. in a perpendicular direction relative to the fore-aft direction of the seat) as the first linkage bar 131 is moved, in use, to move the head rest portion 102 between the various deployed and stowed positions.

In the example shown, the sliding pins 136 are "spring loaded" using springs 3 to exert an outward compression force in a direction towards the sliding pins 136 and the runners 135. The outward compression force provided by the springs 3 allows the sliding pins 136 to engage with, and be retained in, the respective ramped recesses 138*a*, 138*b*, 138*c* positioned on each side along both runners 135, thereby retaining the head rest portion 102 in a stowed or deployed position. The ramped recesses 138*a*, 138*b*, 138*c* positioned on each side along both runners 135 provide a plurality of different positions that the head rest portion 102 can be manually adjusted to and retained at.

The ramped recesses 138*a*, 138*b*, 138*c* shown in FIG. 9 are ramped such that the sliding pin 136 may disengage said ramped recesses 138*a*, 138*b*, 138*c* when a user of the head restraint assembly 100 provides a sufficient force on the head rest portion 102 to move the head rest portion 102 between the various stowed and deployed positions. The angle and depth of the ramp may be adapted to vary the required disengagement force required to be applied by the user. For example, increasing the angle of the ramp and depth of the recess will increase the magnitude of the required disengagement force. The skilled person would appreciate that whilst in the example shown, the ramped recesses 138*a*, 138*b*, 138*c* are defined by "straight ramps" the ramped recesses could also be defined by a circular detent or the like.

FIG. 9 shows a head restraint assembly 100 showing two slider members 121 mounted to the main housing 113 defining two runners 135 positioned on either side of the interior of the main housing 113, and two "spring loaded" sliding pins 136, each with a spring 3, positioned on either side of the interior of main housing 113 for illustrative purposes. The present invention however may function with only one slider members 121 defining a runner 135 with a plurality of ramped recesses 138*a*, 138*b*, 138*c* positioned along it, and one "spring loaded" sliding pin 136 with one spring 3 positioned on one side of the interior of main housing 113. The respective ramped recesses 138*a*, 138*b*, 138*c* positioned on that runner 135 may provide a plurality of different intermediate positions that the head rest portion 102 may be manually adjusted to and retained at.

The second linkage bar 132 is a solid part including a main stem 132*a* and an upper U-shaped portion comprising left and right side arms 132*b*, 132*c*. The left and right side arms 132*b*, 132*c* of the second linkage bar 132 are pivotally mounted, at the forward ends, to the upper end 103 of the movable head rest portion 102. The rear end of the second linkage bar 132 is fixedly mounted, via the main stem 132*a*, to the main housing 113 via a connecting pin mounted to the rear end of the second linkage bar 132 (not visible in FIG. 5). The connecting pin substantially inhibits translation of the rear end of the second linkage bar 132 relative to the main housing 113 but allows pivotal movement of the second linkage bar 132 relative to the main housing 113.

The pivotal connections between the forward ends of the first and second linkage bars 131, 132 and the head rest portion 102 are on the internal side of the movable head rest portion 102, on the reverse side to the rest surface 108, 109.

For the purpose of the following description, only one side of the first linkage bar 131 and of the second linkage bar 132 will be referred to, with reference to the side views in FIGS. 2 to 4.

The first and second linkage bars 131, 132 are pivotally coupled together part-way along their lengths via a connecting pin or bolt 133 where the first linkage bar 131 and the second linkage bar 132 intersect. A connecting pin 133 is provided for each of the linkage arms 131a, 131b, one on each side of the second linkage arm 132. The connecting pin 133 is located approximately mid-way between the upper and lower ends 103, 106, of the head rest portion 102 but slightly further towards the lower end 106. The connecting pin 133 is fixed within an aperture 134 provided in the first linkage bar 131. The aperture 134 may take the form of a slot, as shown in FIG. 3, which guides movement of the connecting pin 133 along the length of the first linkage bar 131 as the head rest portion 102 is adjusted relative to the main housing 113.

The head rest portion 102 is pivotal about a pivot axis 20 positioned at the forward end of the second linkage bar 132. The head rest portion 102 is pivotal by moving the lower end 106 of the movable head rest portion 102, in an aft-fore direction, away from the main housing 113. As a consequence of this movement, the pivot axis 20 is caused to move forwards and downwards slightly, accompanying the movement of the first linkage bar 131. The linkage mechanism 130 of the head restraint assembly 100 therefore enables the head rest portion 102 to move pivotally so as to provide linear displacement of the head rest portion 102 in the aft-fore direction (i.e. away from the main housing 113), as will be described in further detail below.

The friction hinge 139 defines a pivot axis 22 at the lower end 106 of the movable head rest portion 102 about which the forward end of the first linkage bar 131 pivots. The friction hinge 139 serves to secure the head rest portion 102 in place at any one of a plurality of intermediate positions between the stowed and fully deployed positions, and at the fully deployed position itself. Typically, the friction hinge 139 can provide a resistance force in the range of 50-55 Newton's (N) to ensure that the movable head rest portion 102 does not move once it is secured at the fully deployed point or at any one of a plurality of chosen intermediate positions, until such time as a force in excess of the resistance force is applied to the head rest portion 102. The linkage mechanism 130 is particularly intended for use in deploying the movable head rest portion 102 when the passenger is seated in the reclined position and wishes to have their head supported in a raised position. The linkage mechanism 130 is also configured to enable the movable head rest portion 102 to be stowed in the stowed position when the passenger no longer wishes to use it.

In the present invention, deployment of the movable head rest portion 102 is achieved by pulling out the movable head rest portion 102 in the aft-fore direction (i.e. away from the head restraint assembly 100) by hand, manually overcoming the force provided by the friction hinge 139 and the compression force provided by the spring 3 on the "spring loaded" sliding pin 136 that secures the head rest portion 102 in its stowed position, as defined by ramped recess 138a. Conversely, stowage of the movable head rest portion 102 is achieved by pushing the movable head rest portion 102 in the fore-aft direction (i.e. towards the head restraint assembly 100) by hand, manually overcoming the force provided by the friction hinge 139 and the compression force provided by spring 3 on the "spring loaded" sliding pin 136 that has secured the head rest portion 102 in either its fully deployed position, or at any one of the plurality of intermediate positions provided by the plurality of ramped recesses 138b, 138c positioned along the runner 135, causing the sliding pin 136 to disengage from the ramped recess 138.

In some embodiments of the present application, the friction hinge 139 may provide a force sufficient to hold the head rest portion 102 in place in a plurality of intermediate positions, without requiring a "spring loaded" sliding pin 136 with a spring 3 providing a retaining/compression force enabling the sliding pin 136 to engage with a plurality of ramped recesses 138 positioned along a runner 135.

Although in the present invention, deployment and stowage of the movable head rest portion 102 is done by hand, there is potential for an embodiment of the present invention where powering the movement of deployment and stowage mechanisms of the movable head rest portion 102 is achieved automatically using electronic motors, for example.

As the movable head rest portion 102 is moved forward, in the aft-fore direction, away from the main housing portion 113, the first linkage bar 131 is caused to move relative to the second linkage bar 132, about the connecting pin 133, to adjust the angle of intersection, delta angle Δ, between the bars. When the movable head rest portion 102 is in the stowed position, the angle of intersection between the bars 131, 132 is relatively large, approaching 170-180 degrees, and when the movable head rest portion 102 is in the deployed position, the angle of intersection between the first and second bars 131, 132 is relatively small, between approximately 100-140 degrees, depending on the extent of deployment. The angle of intersection between the first and second linkage bars 131, 132 is adjustable by virtue of the pivotal movement of the bars 131, 132 about the connecting pin 133. The angle of intersection is at its maximum when the movable head rest portion 102 is at the stowed position and angle of intersection is at its minimum when the movable head rest portion 102 is at the fully deployed position.

In an embodiment of the present invention, the angle of the fully deployed position of the moveable head rest portion 102 may typically be 30 degrees with respect to the stowed position i.e. the stowed position of the moveable head rest portion 102 being at angle of zero (0) degrees. However, the angle of the fully deployed position of the moveable head rest portion 102 angle may also depend on how far back the seat reclines. The angle of the fully deployed position may be adapted such that a user of the seats head is supported in a comfortable, forward looking position, when the seat is fully reclined.

The housing 101 is electronically moved relative to the fixed seat assembly 10 using motors. These motors may be DC motors or AC motors. These motors may operate on different physical principles, such as magnetic, electrostatic, or piezoelectric. In the embodiment shown in the Figures, there are two motors 140, 150 that facilitate movement of the housing 101 relative to the fixed seat assembly 10. A first motor 140 is housed within the main housing 113 and is configured to control the up and down (i.e. towards and away from the roof of the vehicle) movement of the housing 101 relative to the fixed seat assembly 10. A spindle 141 of the first motor 140 is configured to control the aforementioned up and down movement. A second motor 150 is housed within the main housing 113 and is configured to control the backwards ("fore-aft" direction) and forwards ("aft-fore" direction) movement of the housing 101 relative to the fixed seat assembly 10. Both of the motors 140, 150 may be of the type described above.

The first and second motors 140, 150 are both relatively small and so can be accommodated within the confines of the main housing 113. The first and second motors 140, 150 are supplied with electrical power via wiring that is run through cavities in the support struts 99 of the head restraint assembly 100 (not visible in the Figures). An advantage of the invention of the present application is that it allows the head restraint assembly 100 to be a self-contained, "plug and play", modular head restraint assembly 100, which can minimise labour and assembly costs for vehicle manufacturers whilst improving production efficiency. Another advantage of the present application is that the head restraint assembly 100 can fit into the conventional head restraint housings belonging to existing in-vehicle passenger seats. As a result, it is possible for vehicle manufacturers to retro-fit the head restraint assembly 100 of the present application into production model vehicles with minimal associated costs and effort.

In the present invention, the first and second motors 140, 150 are supplied with electrical power via wiring that is run through cavities in the support struts 99 of the head restraint assembly 100 (not shown in the Figures), connecting them to the main auxiliary power supply of the vehicle 1 (e.g. the car battery). However, it is also possible for a dedicated battery to be located within the main housing 113 and provide electrical power to both the first and second motors 140, 150.

In alternative embodiments (not shown), one or more of the motors may be housed in the passenger seat or seat assembly 10 itself, or somewhere else within the vehicle 1, and may be powered by the vehicle's main battery. It may be particularly useful to house the battery for the up-down motor, optionally with the motor, within the vehicle seat or seat assembly 10.

The passenger is able to manually control the up/down and forward/back movement of the housing 101 relative to the fixed seat assembly 10, by interacting with a dedicated control interface (e.g. control buttons—not shown) located on the head restraint assembly control module. Command signals can be sent to the motors 140 and 150 via the dedicated control interface, which might comprise touch-sensitive control buttons, tactile control buttons, or variable control knobs.

The second motor 150, configured to control the backwards ("fore-aft" direction) and forwards ("aft-fore" direction) movement of the housing 101 relative to the fixed seat assembly 10, has a solid spindle 151 in connection with the linkage mechanism 130. The solid spindle 151 is typically made from a suitably rigid material, such as a metal alloy. The rigidity of the solid spindle can provide a greater resistance to an impact in the backwards ("fore-aft" direction) and forwards ("aft-fore" direction), typically created by a crash or impact. As a result, the solid spindle 151 helps to ensure that the head restraint assembly 100 provides enhanced support to the passenger's head and neck during and after a crash, preventing or mitigating damage to the passenger's cervical vertebrae. This type of linkage mechanism can therefore enhance the overall crash and post-crash health and safety properties of the in-vehicle passenger seat assembly 10 and of the vehicle 1 concerned. Another associated advantage of having a solid spindle in the "fore-aft"/"aft-fore" direction is that there is a more stable movement of the housing 101 relative to the fixed seat assembly 10 in the "fore-aft"/"aft-fore" direction with less unwanted motion in the other directions, which enhances the comfort to the passenger/user.

The housing 101 is movable relative to the fixed seat assembly 10 under the control of the motors 140, 150 in accordance with the requirements of the user. The user can initiate a command signal to activate the motors 140,150 to cause the spindles 141,151 of the motors 140,150 in combination to provide movement of the housing 101 relative to the fixed seat assembly 10 in the desired manner.

Operation of the movable head rest portion 102 will now be described in further detail.

Figure 6:
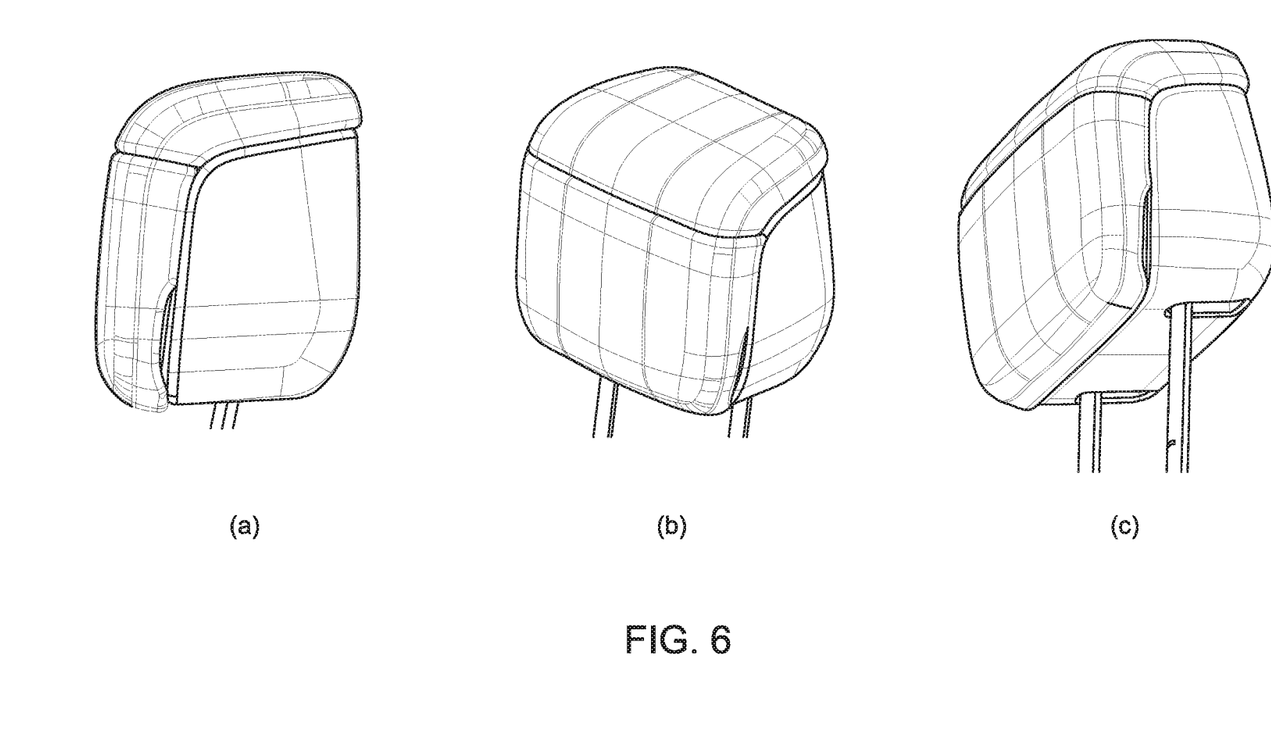
FIGS. 6A-6C illustrate perspective views of the head restraint assembly in FIGS. 2 to 5 when in its stowed position, as viewed from three different perspectives.

Starting from the position shown in FIGS. 5(a)-(c) in which the movable head rest portion 102 is in the stowed position, located within the recess 120 and with the rest surface thereof defining a relatively upright surface for the user's head. In the stowed position the first linkage bar 131 is in a relatively upright position in which the angle of intersection with the second linkage bar 132 is relatively large (not visible in FIG. 6); with the sliding pin 136 located at the upper end of a runner 135 and engaged with ramped recess 138a. As illustrated in FIG. 3, the runner 135 has at least two ramped recesses for the sliding pin 136 to engage. When the sliding pin 136 engages ramped recess 138a at the upper end of a runner 135, the movable head rest portion 102 is in its stowed position.

As illustrated in FIG. 3, when the sliding pin 136 engages the ramped recess 138c (shown in FIG. 9) at the lower end of a runner 135 the movable head rest portion 102 is in its fully deployed position. The action of pulling out the movable head rest portion 102 in the aft-fore direction (i.e. away from the head restraint assembly 100) by hand enables the sliding pin 136, located at the upper end of a runner 135, to disengage from the ramped recess 138a and slide downwards along the runner 135 which, as a consequence, causes the forward end of the first linkage bar 131 to move forwards, pivoting the first linkage bar 131 in a clockwise sense about the connecting pin 133. At the same time the forward end of the first linkage bar 131 pivots in an anti-clockwise sense (as viewed in FIG. 3) about the axis of the friction hinge 139. The force transferred to the first linkage bar 131 is sufficient to overcome the resistance force of the friction hinge 139 and so the lower end of the head rest portion 102 is driven forwards, away from the housing 131. As illustrated in FIG. 3, once the sliding pin 136 engages the ramped recess 138c (shown in FIG. 9) at the lower end of a runner 135, the movable head rest portion 102 is in its fully deployed position.

The delta angle Δ of intersection between the first and second linkage bars 131, 132 is adjusted by virtue of the pivotal movement of the first linkage bar 131 about the connecting axis 133. The angle of intersection between the first and second linkage bars 131, 132 varies depending on the extent to which the sliding pin 136 is driven downwardly along the runner 135 and the extent to which the lower end of the head rest portion 102 is displaced from the housing 113, and reduces as the sliding pin 136 moves downwardly along the runner 135. In other words, the further the head rest portion 102 is moved from the housing, the smaller the angle of intersection between the first and second linkage bars 131, 132.

The head rest portion 102 may be stopped in any one of a plurality of intermediate positions, depending on the requirements of the user. The runner 135 may have a plurality of ramped recesses for the sliding pin 136 to engage, allowing for a plurality of different intermediate positions between the stowed and fully deployed position. In the example shown in FIG. 9, the runner 135 has a ramped recess 138b at one intermediate position, however, in another example the runner 135 may have any number of ramped recesses located at an intermediate position, including zero. At each of a plurality of different intermediate positions, the friction hinge 139 holds the head rest portion 102 in any one of the intermediate positions, until a manually applied force disengages the sliding pin 136 from one of the plurality of ramped recesses 138 along the runner 135. In an embodiment, the friction hinge 139 provides sufficient force to support a user's head on the head rest portion 102 at any number of intermediate positions, including intermediate positions not defined by a ramped recess.

Figure 7:
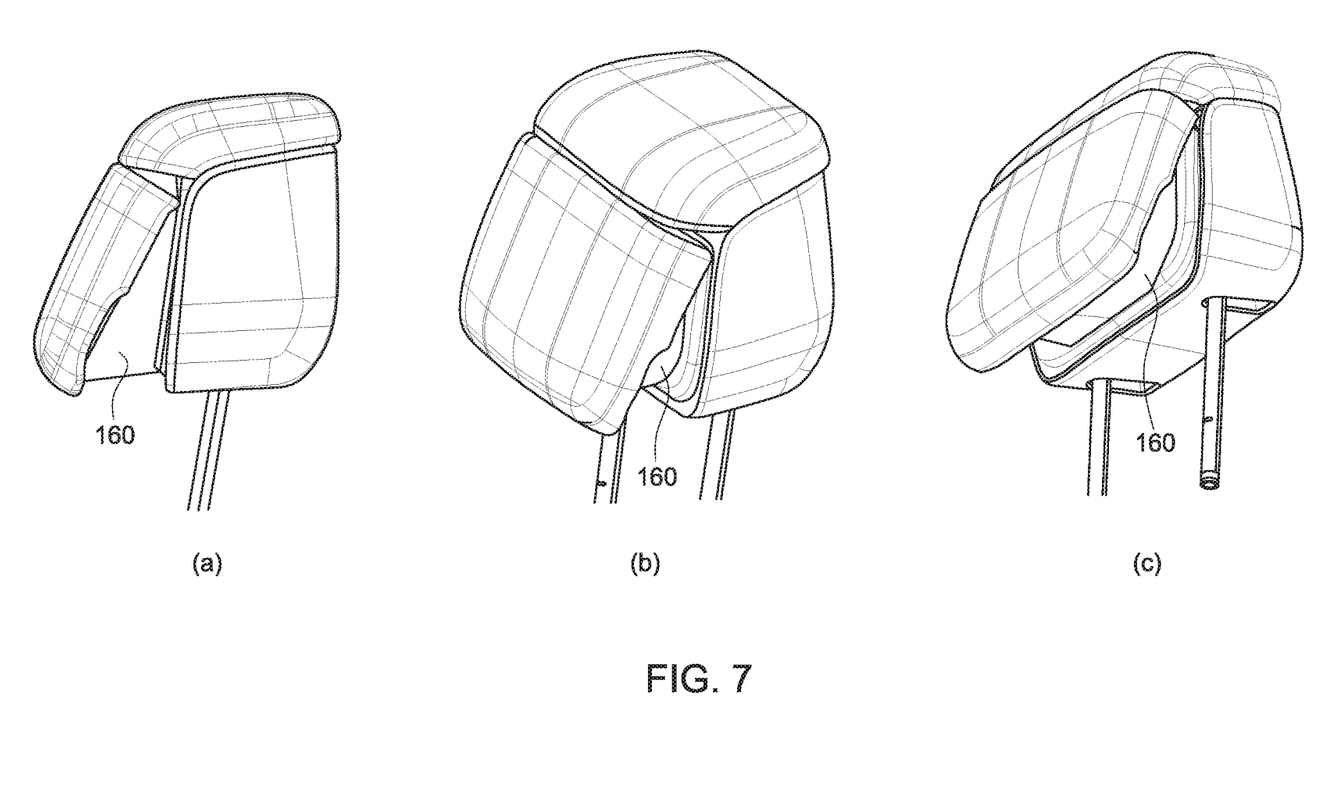
FIGS. 7A-7C illustrate perspective views of the head restraint assembly in FIGS. 2 to 5 when in its deployed position, as viewed from three different perspectives.

The action of pulling out the movable head rest portion 102 in the aft-fore direction (i.e. away from the head restraint assembly 100) by hand, manually overcomes the force provided by the friction hinge 139 and disengages the sliding pin 136 from one of the plurality of ramped recesses 138a, 138b, 138c along the runner 135. Pulling out the movable head rest portion 102 in the aft-fore direction further causes the sliding pin 136 to slide downwards along the runner 135, towards the fully deployed position. The first linkage bar 131 is caused to move in the aft-fore direction, pulling the lower end 106 of the head rest portion 102 with it. Eventually, the sliding pin 136 reaches the ramped recess 138c at the lower end of the runner 135, and the first linkage bar 131 is moved as far forwards as possible, so that the head rest portion 102 adopts its fully deployed position, as shown in FIGS. 7(a)-6(c).

The action of pushing the movable head rest portion 102 in the fore-aft (i.e. towards the head restraint assembly 100) by hand, manually overcomes the force provided by the friction hinge 139 and disengages the sliding pin 136 from one of the plurality of ramped recesses 138a, 138b, 138c along the runner 135. Pushing the movable head rest portion 102 in the fore-aft direction further causes the sliding pin 136 to slide upwards along the runner 135, towards the stowed position. When it is required to return the head rest portion 102 to its stowed position, as shown in FIGS. 6(a)-(c), the sliding pin 136 moves upwardly along the runner 135 until it reaches and engages with the uppermost ramped recess 138a. The first linkage bar 131 is caused to move in a fore-aft direction, drawing the lower end 106 of the head rest portion 102 to move with it. The movable head rest portion 102 reaches its fully stowed position when it resides fully within the recess 120 and the sliding pin 136 is located at the upper end of a runner 135 and engages with ramped recess 138a.

The movable head rest portion 102 of the head restraint assembly 100 may be cushioned or padded. The housing 101 of the head restraint assembly 100 may also be cushioned or padded in the same manner as the movable head rest portion 102. For aesthetic reasons, the cushioned or padded housing 101 and/or movable head rest portion 102 may be upholstered with leather, polyurethane leather, or suede cloth.

The recess 120 of the head restraint assembly 100 may be visibly covered by a suitable synthetic or cotton-based stretch fabric material 160 (visible in FIGS. 2 and 3 FIGS. 7(a)-(c)). The stretch fabric material 160 is typically attached to each side of the moveable head rest portion 102 and to each side of the main housing 113 via fixings (not shown). When the head rest portion 102 is stowed, the stretch fabric material 160 is folded and accommodated within the space of the recess 120 within the closed unit and therefore hidden from view, as shown in FIGS. 6(a)-(c). As the head rest portion 102 is deployed, the stretch fabric material 160 becomes stretched to cover the gaps which open up on either side between the main housing 113 and the head rest portion 102. In this way the internal parts of the assembly are shielded from view when the head rest portion 120 is deployed.

Many modifications may be made to the above examples without departing from the scope of the present invention as defined in the accompanying claims.

The invention claimed is:

1. A head restraint assembly for a vehicle seat, the head restraint assembly comprising:
  a housing;
  a movable head rest portion which defines at least a part of a rest surface for a seat user's head; and
  a linkage mechanism pivotally mounting the movable head rest portion to the housing,
    wherein the linkage mechanism is configured to allow movement of the movable head rest portion to enable an angle of the rest surface to be adjusted relative to the housing,
    wherein the linkage mechanism includes first and second linkage bars,
    wherein the first linkage bar is pivotally coupled to the housing via a sliding pin and the sliding pin is configured to engage a runner within the housing,
    wherein the runner comprises at least a first recess configured to receive the sliding pin to secure the head rest portion in a first deployed position and a second recess configured to receive the sliding pin to secure the head rest portion in a second deployed position,
    wherein the first linkage bar is pivotally mounted to the movable head rest portion at a forward end of the first linkage bar and the sliding pin is engaged with the runner at a rearward end of the first linkage bar,
    wherein the second linkage bar is pivotally mounted to the movable head rest portion at a forward end of the second linkage bar to define a pivot axis of the movable head rest portion,
    wherein the second linkage bar is mounted to the housing at a rearward end of the second linkage bar,
    wherein the first and second linkage bars are pivotally coupled via a connecting pin,
    wherein the connecting pin is received within an aperture provided in the first or second linkage bar,
    wherein the aperture comprises a slot and the slot is configured to guide movement of the connecting pin along a length of the first linkage bar or the second linkage bar as the head rest portion is adjusted relative to the housing,
    wherein the movable head rest portion is pivotal about the pivot axis by causing a first end of the movable head rest portion to move toward or away from the housing, and
    wherein the linkage mechanism is configured such that the pivot axis moves away from the housing when the first end of the movable head rest portion is moved away from the housing.

2. The head restraint assembly as claimed in claim 1, wherein the housing defines a recess and wherein the movable head rest portion is pivotally movable relative to the housing between a stowed position in which it resides within the recess and the first and second deployed positions in which at least a first end of the movable head rest portion is displaced away from the housing.

3. The head restraint assembly as claimed in claim 1, wherein an upper portion of the rest surface is defined by the housing and a lower portion of the rest surface is defined by the movable head rest portion.

4. The head restraint assembly as claimed in claim 1, wherein the forward end of the first linkage bar is pivotally mounted to the movable head rest portion via a friction hinge.

5. The head restraint assembly as claimed in claim 1 wherein the sliding pin is arranged to enable the rearward end of the first linkage bar to slide perpendicularly relative to a fore-aft direction of the seat.

6. The head restraint assembly as claimed in claim 1, wherein the housing defines two runners arranged to be located on either side of the rearward end of the first linkage bar, and the first linkage bar comprises two sliding pins configured to engage the two runners.

7. The head restraint assembly as claimed in claim 1, wherein the runner comprises at least one other recess configured to secure the head rest portion in the stowed position.

8. The head restraint assembly as claimed in claim 7, wherein the runner comprises at least one further recess configured to secure the head rest portion in at least one intermediate position.

9. The head restraint assembly as claimed in claim 1, wherein the sliding pin is spring loaded.

10. The head restraint assembly as claimed in claim 1, wherein the housing is movable in an up-down direction relative to the seat, wherein the head restraint assembly comprises a first motor for controlling movement of the housing in the up-down direction, and wherein the first motor is housed within the housing.

11. The head restraint assembly as claimed in claim 10, comprising a second motor for controlling aft-fore and fore-aft direction movement of the housing, wherein the second motor is housed within the housing.

12. The head restraint assembly as claimed in claim 11, wherein the second motor has a solid spindle connection.

13. The head restraint assembly of claim 1, wherein
the linkage mechanism is configured to allow pivotal movement of the movable head rest portion to enable the angle of the rest surface to be adjusted relative to the housing;
the housing defines a recess; and
the movable head rest portion is pivotally movable relative to the housing between the first and second deployed positions in which at least a first end of the movable head rest portion is displaced away from the housing and a stowed position in which the movable head rest portion resides within the recess.

14. A seat assembly comprising the head restraint assembly as claimed in claim 1.

15. A vehicle comprising the seat assembly of claim 14.

16. The head restraint assembly of claim 1, wherein
the first linkage bar is pivotally mounted to the moveable headrest portion near a second end of the moveable headrest portion;
the linkage mechanism is configured such that the pivot axis and the first end of the moveable headrest portion move a larger distance from the housing than the second end of the moveable headrest portion.

17. The head restraint assembly of claim 16, wherein the first end of the moveable headrest portion is near a top of the head restraint assembly and the second end of the moveable headrest portion is near a bottom of the head restraint assembly.

18. The head restraint assembly of claim 1, wherein the forward end of the second linkage bar moves further from the housing than the forward end of the first linkage bar as the moveable headrest portion pivots about the pivot axis and moves away from the housing.

* * * * *